United States Patent [19]
Katsurahira et al.

[11] Patent Number: 6,005,555
[45] Date of Patent: Dec. 21, 1999

[54] POSITION DETECTING APPARATUS AND METHOD FOR DETECTING POSITION POINTING DEVICE

[75] Inventors: Yuji Katsurahira; Yasushi Sekizawa, both of Saitama-ken, Japan

[73] Assignee: Wacom Co., Ltd., Saitama-ken, Japan

[21] Appl. No.: 08/840,617

[22] Filed: Apr. 30, 1997

[30] Foreign Application Priority Data

Dec. 5, 1996 [JP] Japan .................................. 8-340495

[51] Int. Cl.$^6$ ...................................................... G09G 5/00
[52] U.S. Cl. ...................... 345/174; 345/179; 178/18.07; 178/18.06
[58] Field of Search ..................................... 345/173, 174, 345/179, 157, 156; 178/18.01, 18.07, 19.01, 19.3, 19.07

[56] References Cited

U.S. PATENT DOCUMENTS

| | | |
|---|---|---|
| 4,878,553 | 11/1989 | Yamanami et al. .................. 178/18.07 |
| 5,214,427 | 5/1993 | Yano .......................................... 341/20 |
| 5,466,896 | 11/1995 | Murakami et al. .................. 178/18.07 |
| 5,567,920 | 10/1996 | Watanabe et al. .................... 178/18.07 |
| 5,600,105 | 2/1997 | Fukuzaki et al. ..................... 178/19.06 |
| 5,693,914 | 12/1997 | Ogawa .................................. 178/18.07 |
| 5,734,377 | 3/1998 | Fukuzaki ................................. 345/173 |

*Primary Examiner*—Steven J. Saras
*Assistant Examiner*—Fritz Alphonse
*Attorney, Agent, or Firm*—Finnegan, Henderson, Farabow, Garrett & Dunner, L.L.P.

[57] ABSTRACT

A position detecting apparatus capable of detecting position pointing devices of any combination simultaneously out of plural position pointing devices, thereby providing a user a friendly apparatus. A frequency of a resonance circuit provided inside a position pointing device is set by a command signal transmitted from a tablet, causing plural position pointing devices placed on the tablet to have a different frequencies, thereby suppressing electromagnetic interference among position pointing devices on the tablet, so that a simultaneous detection becomes available.

33 Claims, 10 Drawing Sheets

POSITION DETECTING APPARATUS AND METHOD FOR DETECTING POSITION POINTING DEVICE

BACKGROUND OF THE INVENTION

1. Field of the Invention

The present invention relates to a position detecting apparatus and a position detecting device thereof, said position detecting apparatus having the capability of detecting more than one position pointing devices simultaneously.

2. Description of the Related Art

U.S. Pat. No. 4,878,553 discloses a position detecting apparatus with a cordless position pointing device wherein a resonance circuit is installed in the position pointing device enabling cordless communication between a tablet and the position pointing device. An apparatus that operates easily is thus provided. U.S. Pat. No. 5,466,896, an improvement on said U.S. patent, further discloses a position detecting apparatus wherein plural position pointing devices are detected on the same tablet simultaneously by providing a distinct resonance frequency to each position pointing device. The disclosures of U.S. Pat. Nos. 4,878,553 and 5,466,896 are hereby incorporated by reference.

A conventional position detecting apparatus disclosed in the prior art, however, could detect plural position pointing devices on the same tablet only if different frequencies are assigned to resonance circuits in advance in order to avoid electromagnetic interference.

In general, a user does not have a conscious awareness of which position pointing device has a particular frequency. A user therefore often makes the mistake of picking up two position pointing devices which have the same frequency and tries to use them simultaneously.

SUMMARY OF THE INVENTION

The purpose of the present invention is to provide a position detecting apparatus wherein any combination of two or more position pointing devices are detected on the same tablet, provided those position pointing devices are operable on the tablet.

In order to cope with such a problem, the present invention configures a resonance circuit installed in a position pointing device capable of being set to at least one of two frequencies. In order to set a frequency of the resonance circuit to one of the at least two frequencies, an instruction signal is transmitted from the tablet which is in turn received by the position pointing device for setting the resonance frequency.

This invention also configures the position pointing device wherein the resonance circuit installed inside the device, having a predetermined resonance frequency in the initial state, can be changed to another predetermined frequency by receiving an instruction signal with said predetermined frequency electromagnetic wave from the tablet.

The present invention also configures the position detecting apparatus wherein the tablet transmits an electromagnetic wave indicating a binary code with two kinds of transmission continuation duration, the position pointing device having plural sets of integration circuits and comparators detecting the duration of induced voltage generated in the resonance circuit in accordance with the threshold voltage value of the comparators and time constant of the integrated circuits, capable of converting the duration to a binary code enabling a change in the resonance frequency in the resonance circuit in accordance with the binary code.

Thus, even if plural position pointing devices with the same configuration are placed on a tablet, a binary code as an instruction signal to set a resonance circuit in each position pointing device with a different frequency is transmitted to each device, and in the position pointing device, the binary code is detected to switch the resonance frequency in accordance with the detected binary code.

In this way, more than one position pointing device with the same configuration may be placed on the tablet. By transmitting an instruction signal to set a resonance circuit in each position pointing device to a different frequency, it is possible to detect the devices simultaneously without an electromagnetic interference among position pointing devices.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

Reference will now be made in detail to the present preferred embodiments of the invention, examples of which are illustrated in the accompanying drawings.

Figure 1:
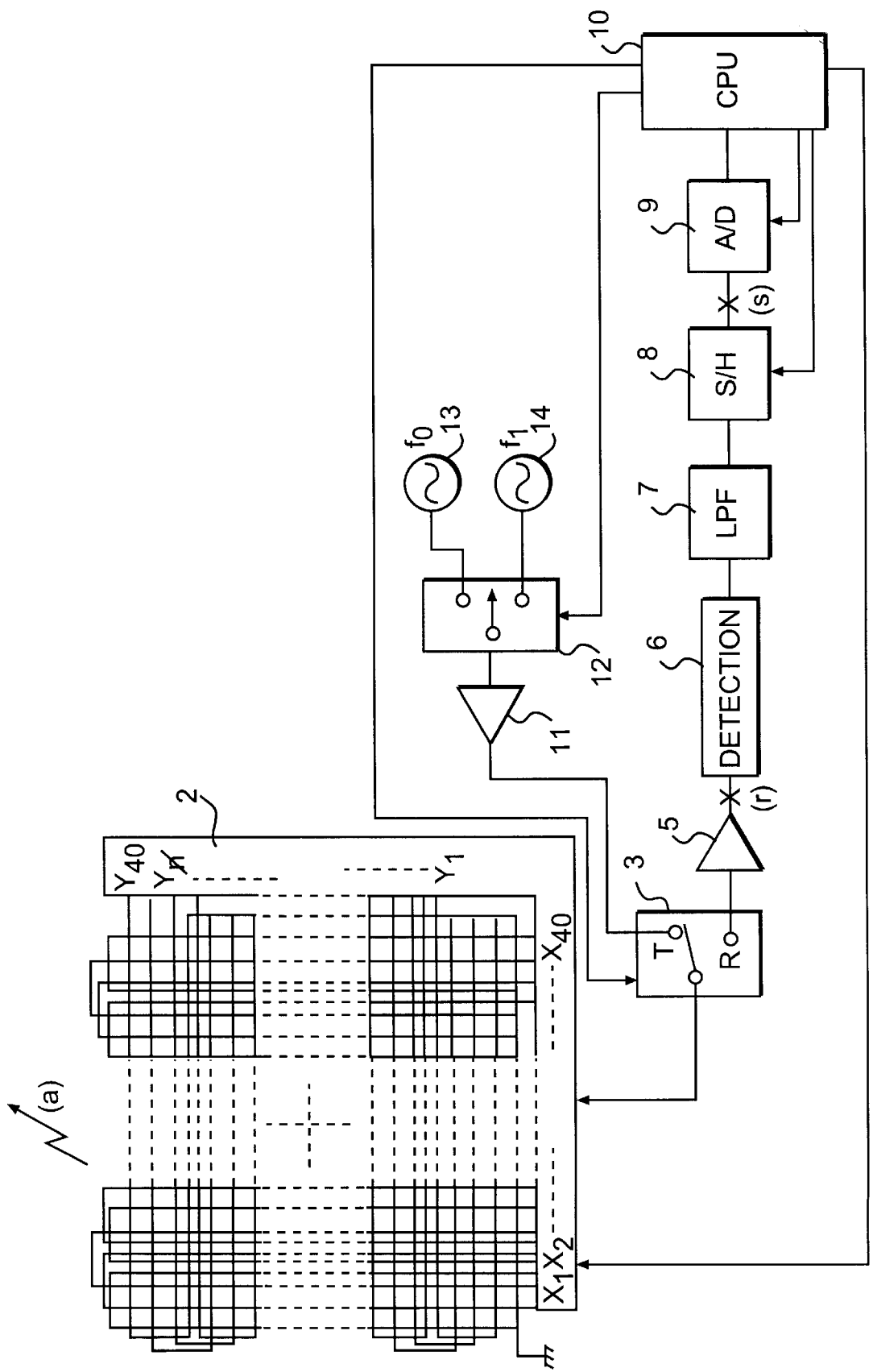
FIG. 1 is a circuit configuration diagram of a tablet.

FIG. 1 illustrates a circuit configuration diagram of a tablet as a position detecting apparatus in a first embodiment. In FIG. 1, forty loop coils X1~X40 are arranged on the x-axis, while forty loop coils Y1~Y40 are arranged on the y-axis in parallel with the detection direction as is shown in FIG. 1.

The loop coils are connected to the selection circuit 2 which selects respective loop coils. The selection circuit 2 is connected to the transmission/reception changeover circuit 3, the reception side of which is connected to the amplifier 5, which is further connected to the detector circuit 6. The detector circuit 6 is connected to the low-pass filter 7, which is connected to the sample hold circuit 8, which is connected to the A/D conversion circuit (analogue/digital conversion circuit) 9, which is connected to the CPU (central processing unit) 10.

The transmission side of the transmission/reception changeover circuit 3 is connected to the current driver 11, the input terminal of which is connected to the frequency changeover switch 12, which is connected to the oscillators 13 and 14. Each oscillator 13 and 14 has a different frequency. The switch 12 is capable of selecting either frequency f0 or f1 among electromagnetic waves transmitted from the tablet in accordance with the control signal of the CPU 10.

This frequency f0, as explained later, is set to be equal to the resonance frequency of the position pointing device in its reset mode, and frequency f1 is set to be equal to the changed resonance frequency after the position pointing device receives a predetermined instruction signal. CPU 10 also sends other control signals to the selection circuit 2, the sample hold circuit 8, the A/D conversion circuit 9, and the transmission/reception changeover circuit 3 respectively.

Figure 2:
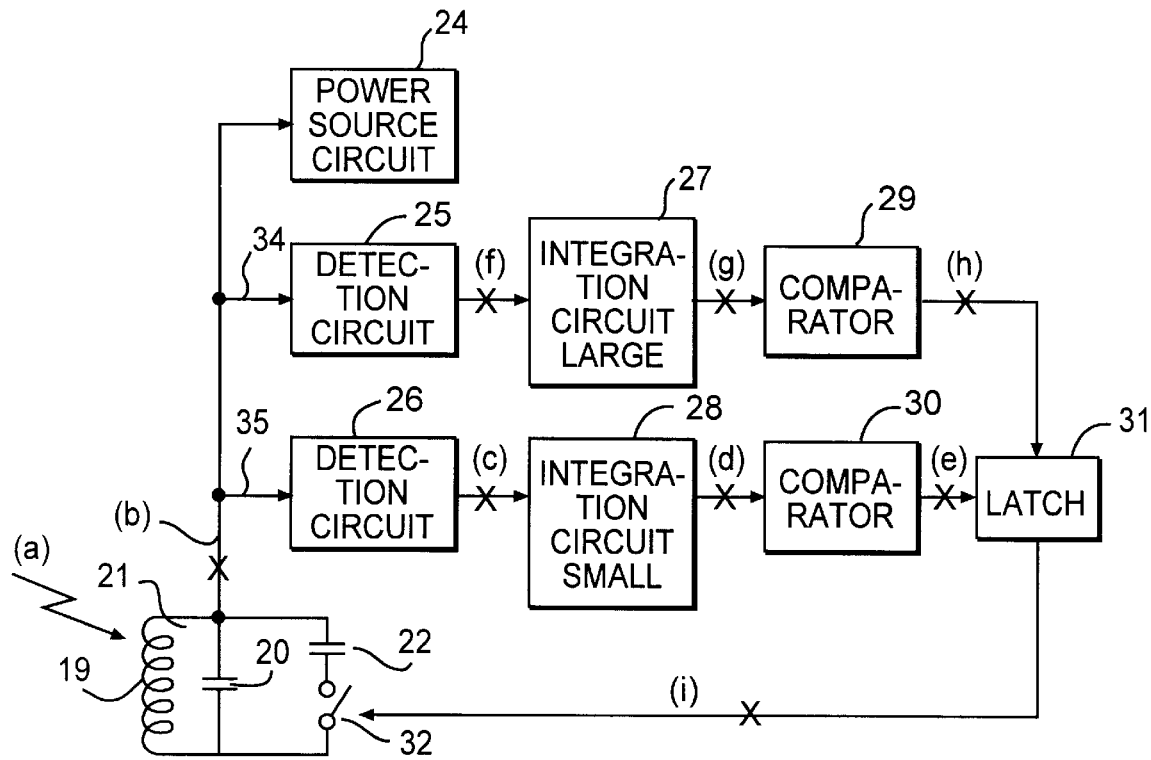
FIG. 2 is a circuit configuration diagram of a first embodiment of a position pointing device.

FIG. 2 illustrates a circuit configuration diagram of the position pointing device in accordance with a first embodiment.

In FIG. 2, a coil 19 and a capacitor 20 together comprise a resonance circuit 21. A capacitor 22 is connected to the resonance circuit 21 via a switch 32. The values of the coil 19, capacitor 20, and capacitor 22 are selected in such a way that when the switch 32 is Off, i.e. at the reset mode, the resonance frequency of the resonance circuit 21 becomes f0; when the switch 32 is On, the resonance frequency of the resonance circuit becomes f1. The resonance circuit 21 is connected to a power-source circuit 24, detector circuit 25, and detector circuit 26.

The detector circuit 25 is connected to a large time constant integration circuit 27, and the detector circuit 26 is connected to a small time constant integration circuit 28. The integration circuit 27 is connected to a comparator 29, and the integration circuit 28 is connected to a comparator 30 respectively.

The comparator 29 is connected to a data terminal D of a latch circuit 31, and the comparator 30 is connected to the trigger terminal T of the latch circuit 31. The output of the latch circuit 31 is connected to the switch 32.

The integration circuit 27 and the comparator 29 comprise a first path 34 supplying the output to the data terminal D of the latch 31 and are configured to have a relationship between the time constant of the integration circuit 27 and the threshold value of the comparator 29 to output the output signal when an electromagnetic wave is transmitted for a first predetermined duration (in the current embodiment, a sufficiently longer duration than 300 $\mu$S) from the tablet shown in FIG. 1.

The integration circuit 28 and the comparator 30 comprise a second path 35 supplying the output to the trigger terminal T of the latch 31 and are configured to have a relationship between the time constant of the integration circuit 28 and the threshold value of the comparator 30 to output the output signal when an electromagnetic wave is transmitted for a second predetermined duration shorter than the first predetermined duration (in the current embodiment, a sufficiently longer duration than 100 $\mu$S) from the tablet. These first and second paths are one of the characteristics of the present invention.

Figure 3:
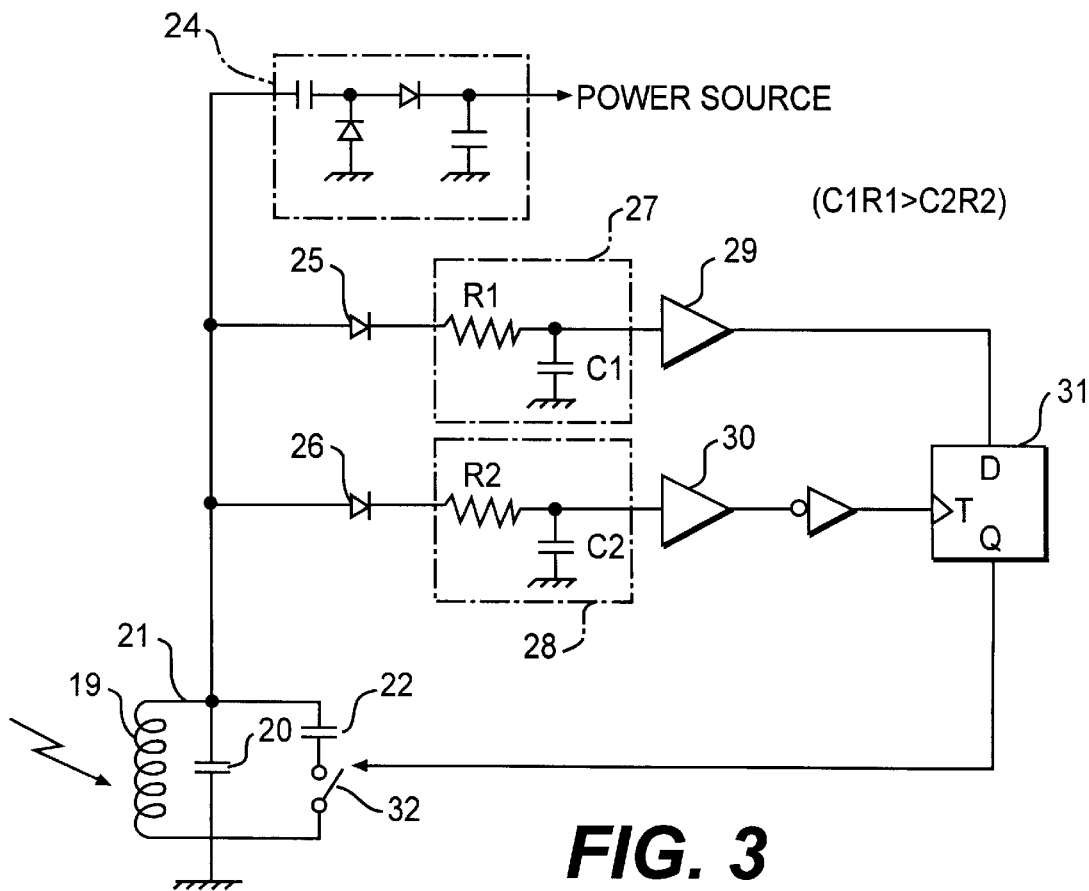
FIG. 3 is a specific circuit configuration diagram of the first embodiment of the position pointing device.

The specific circuit configuration of FIG. 2 is shown in FIG. 3, wherein the reference numbers in FIG. 3 identical to the reference numbers in FIG. 2 indicate the same items. The circuit is configured in such a manner that C1R1 is larger than C2R2.

Figure 4:
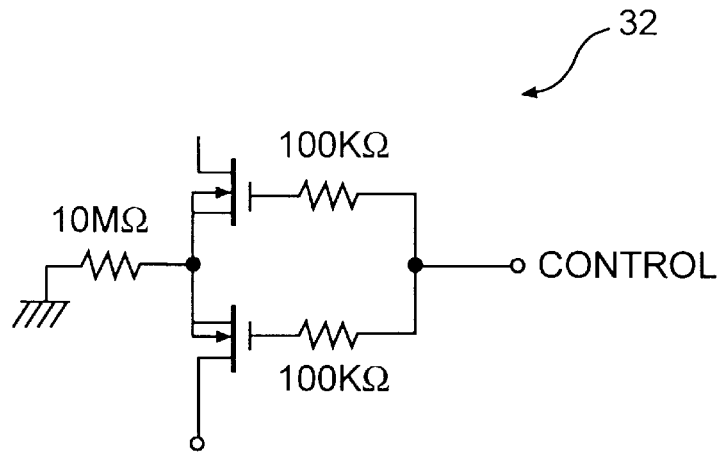
FIG. 4 is a circuit diagram of an analog switch according to the first embodiment shown in FIG. 3.

FIG. 4 shows one details example of an analog switch 32. As shown in FIG. 4, the analog switch 32 may include two MOSFETS. This allows switching of both positive and negative signals. Preferable, the switch 32 has the smallest possible on-resistance to minimize loss. Further, the switch 32 preferable assumes on OFF or open status when no power is applied.

Figure 5A:
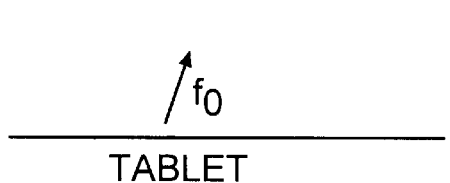
FIGS. 5(A)–5(N) show schematic diagrams of the signal relationship between a tablet and position pointing devices according to the first embodiment.

Hereinafter, the simultaneous detection of the two position pointing devices configured as illustrated in FIG. 2 on the tablet configured as illustrated in FIG. 1 will be explained. FIGS. 5A–5N schematically show the relationship between the tablet and the position pointing devices, while FIG. 6 illustrates a flow diagram of an operation control program memorized in the CPU 10. Table 1 shows the relationship between the operations shown in FIGS. 5A–5N and the steps shown in FIG. 6.

TABLE 1

Figure 5B:
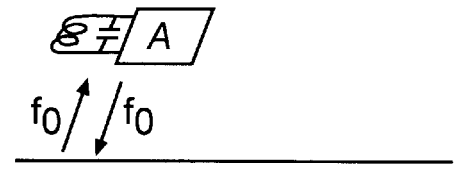
Figure 5C:
Figure 5D:
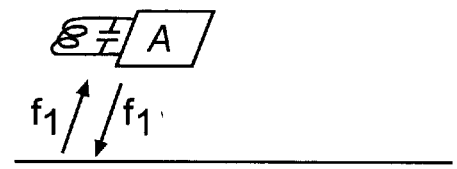
Figure 5E:
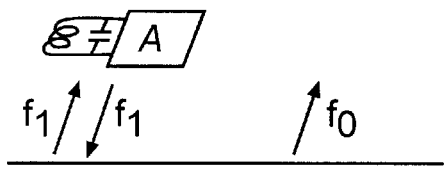
Figure 5F:
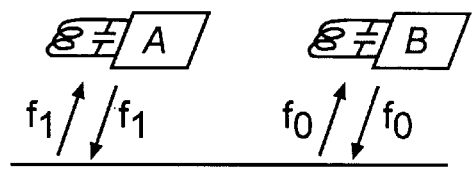
Figure 5G:
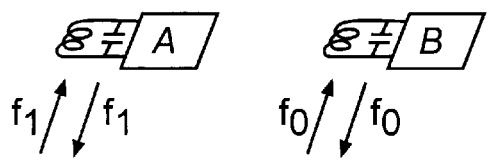
Figure 5H:
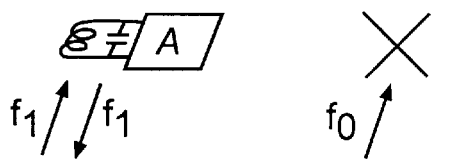
Figure 5I:
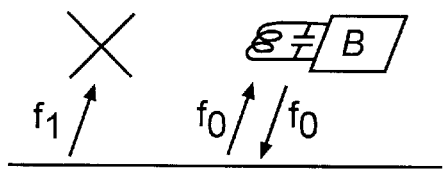
Figure 5J:
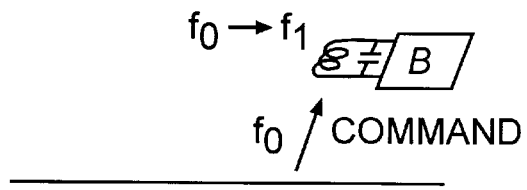
Figure 5K:
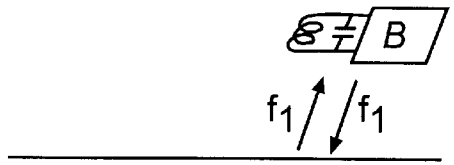
Figure 5L:
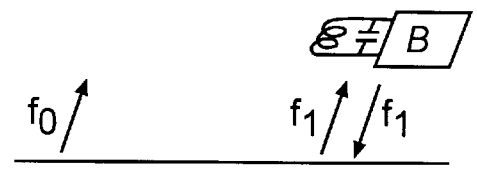
Figure 5M:
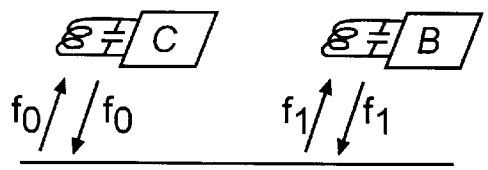
Figure 5N:
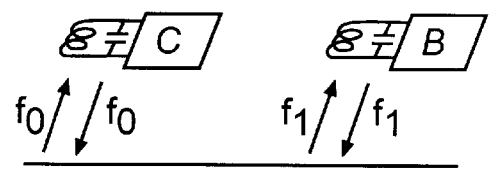
Figure 6:
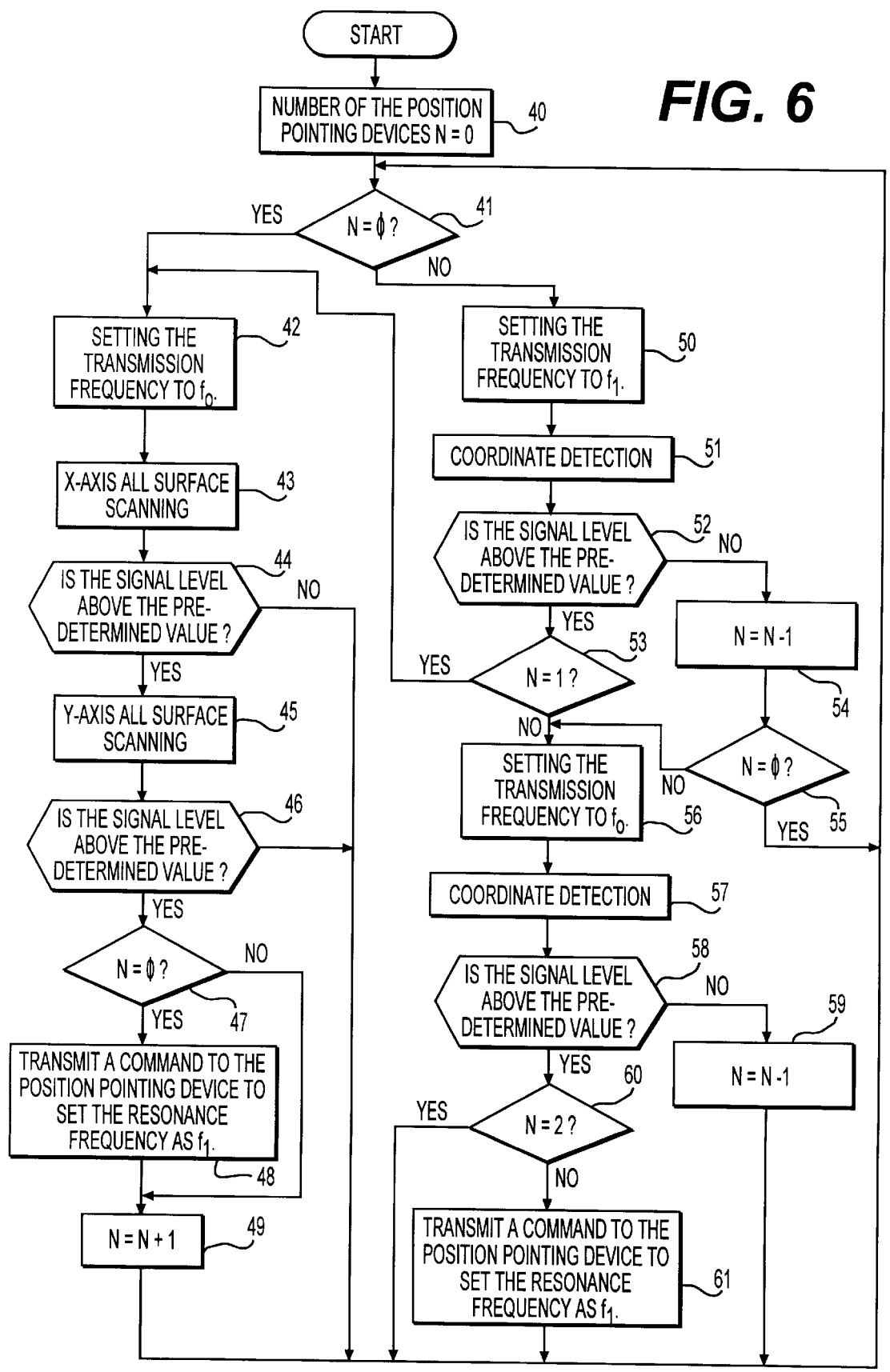
FIG. 6 is a flow chart of an operation control program memorized in the CPU 10.

| FIGS. 5A–5N | Process Description | FIG. 6 Steps |
|---|---|---|
| FIG. 5A | All surface scan | 42–44 |
| FIG. 5B | All surface scan | 42–47 |
| FIG. 5C | Frequency change command | 48 |
| FIG. 5D | Partial scan | 50–53 |
| FIG. 5E | Partial and all surface scan | 50–53, 42–44 |
| FIG. 5F | Partial and all surface scan | 50–53, 42–47, 49 |
| FIG. 5G | Partial scan | 50–60 |
| FIG. 5H | Partial scan | 50–58, 59 |
| FIG. 5I | Partial scan | 50–52, 54, 55, 56–60 |
| FIG. 5J | Frequency change command | 61 |
| FIG. 5K | Partial scan | 50–53 |
| FIG. 5L | Partial and all surface scan | 50–53, 42–44 |
| FIG. 5M | Partial and all surface scan | 50–53, 42–47, 49 |
| FIG. 5N | Partial scan | 50–60 |

Figure 7:
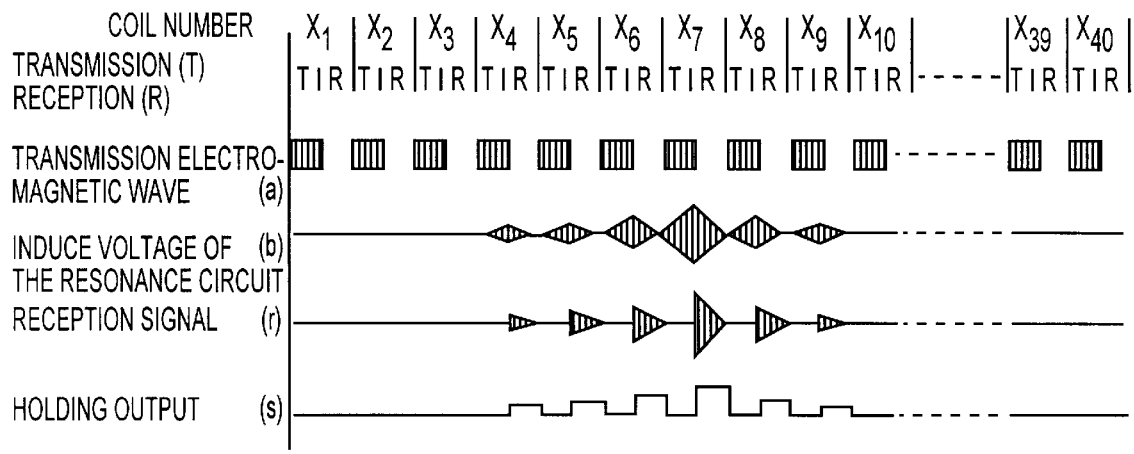
FIG. 7 is an output waveform diagram showing outputs at points indicated by x signs in FIGS. 1 and 2.
Figure 8:
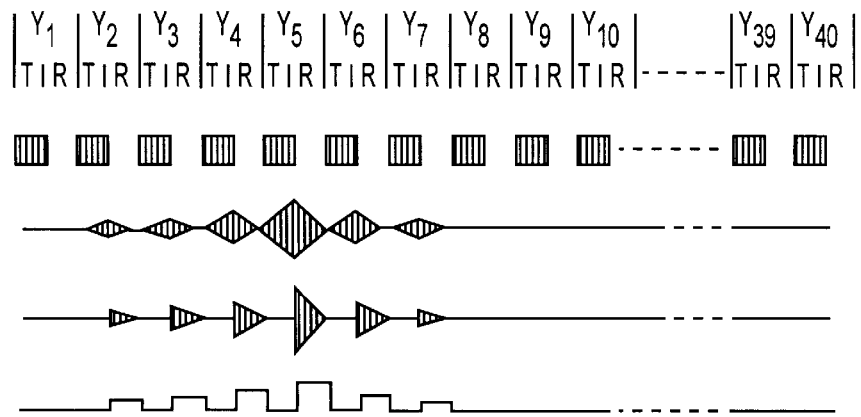
FIG. 8 is an output waveform diagram showing outputs at points indicated by x signs in FIGS. 1 and 2.
Figure 9:
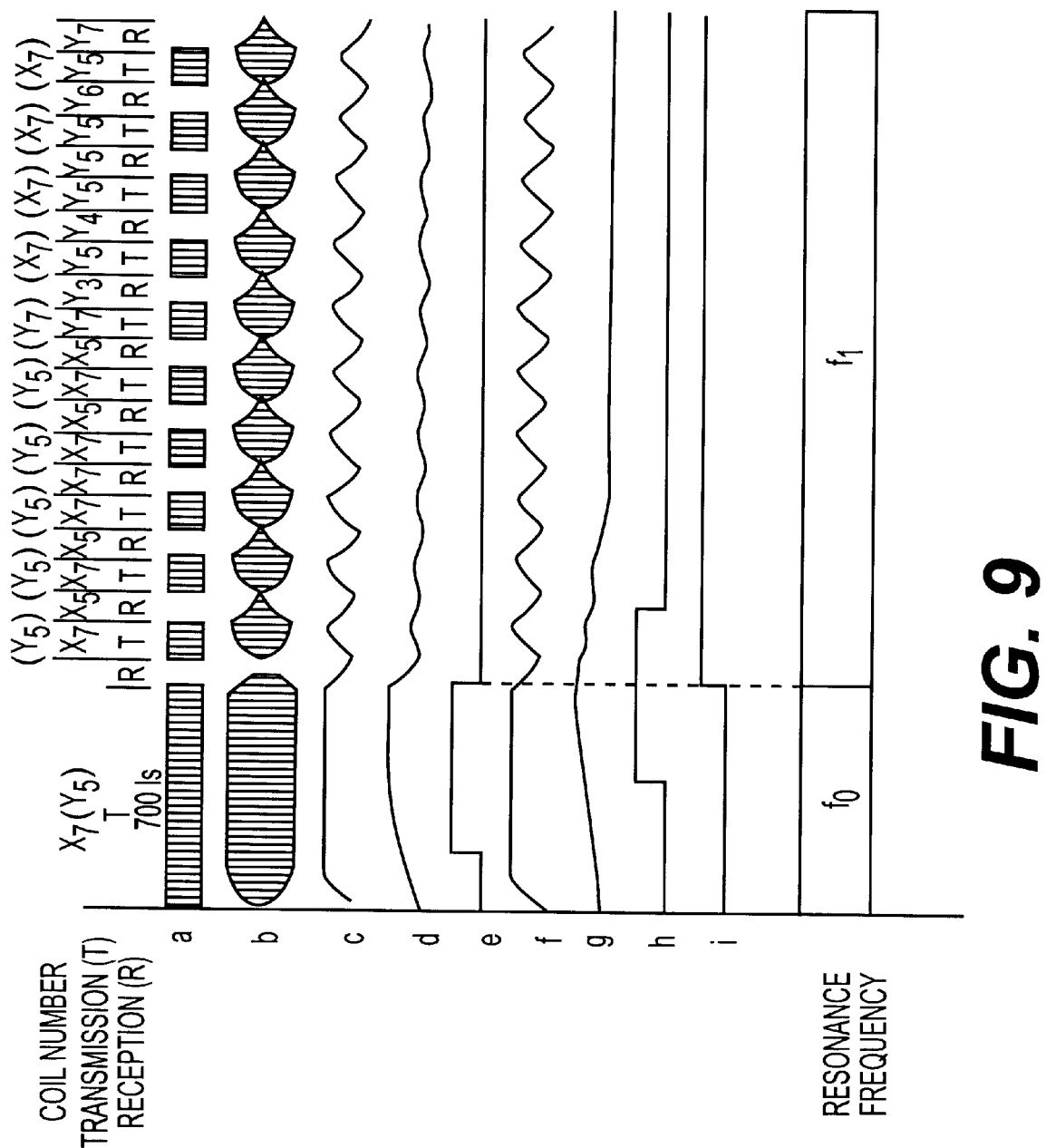
FIG. 9 is an output waveform diagram showing outputs at points indicated by x signs in FIG. 2.

FIGS. 7, 8, and 9 are the output waveform diagrams at points shown in FIGS. 1 and 2 with x signs. In the diagrams, the coil number means a selected loop coil, T means a transmission period (transmission period from the position detecting apparatus), and R means a reception period (reception period of the position detecting apparatus).

First, as the reset mode, (see FIG. 6) the number of the position pointing devices placed on the tablet illustrated in FIG. 1 is set to 0, i.e., it is set for N=0 (step 40).

Then, all surface scanning (steps 42~47) is conducted in order to detect whether a position pointing device configured as in FIG. 2 is placed on the tablet or not (step 41). The all surface scanning needs to be conducted with the frequency f0, which is the reset mode frequency of the position-pointing device. The CPU 10 sends out a control signal to connect the frequency change over switch 12 to the side where the oscillator for f0 is connected (step 42). Then, all surface scanning in the X-axial direction is conducted. This all surface scanning is conducted in the same manner as the conventional position detector.

In all surface scanning, the CPU 10 directs the selection circuit 2 to select the loop coil X1, connects the transmission/reception changeover circuit 3 to the transmission side terminal T, and provides a signal with the frequency f0 to the loop coil X1. An electromagnetic wave with the frequency f0(a) is thus transmitted from the loop coil X1. After the CPU 10 carries out the transmission for a predetermined duration (for example, T=100 $\mu$S), the selection circuit 2 switches the transmission/reception changeover circuit 3 to the reception side while keeping the loop coil X1 and receives a signal from the position pointing device for a pre-determined duration (for example, T=100 µS).

The aforementioned operation is conducted for each loop coil X1~X40 (step 43) in the X-axial direction. The loop coil emitting a signal above a predetermined level is detected (step 44). If a signal above the pre-determined level is not detected in step 44, it is determined that a position detecting device does not exist on the tablet (FIG. 5A). The operation then skips steps 45~49 and returns to step 41, repeating the X-axial all surface scanning (steps 43 and 44) until a position pointing device is detected.

If a signal above the pre-determined level is detected in step 44, it is determined that a position pointing device exists on the tablet (FIG. 5B), and Y-axial entire surface scanning (step 45) is thereby conducted.

The Y-axial entire surface scanning is conducted in the same manner as the X-axial entire surface scanning. The CPU 10 directs the selection circuit 2 to select the loop coil Y1, connects the transmission/reception changeover circuit 3 to transmission side terminal T, and supplies a signal with the frequency f0 to the loop coil Y1. An electromagnetic wave with the frequency f0 (a) is thus transmitted from the loop coil Y1.

After the CPU 10 carries out the transmission for a pre-determined time (for example, T=100 µS), the selection circuit 2 switches the transmission/reception changeover circuit 3 to the reception mode side while monitoring the loop coil Y1, and receives a signal from the position pointing device for a pre-determined time (for example, T=100 µS).

The aforementioned operation is conducted on each loop coil Y1~Y40 (step 45) in the Y-axial direction as illustrated in FIG. 8. The loop coil emitting a signal above a predetermined level is detected (step 46). If a signal above the pre-determined level is not detected in step 46, it is determined that a position detecting device does not exist on the tablet. The operation then returns to step 41 and repeats the entire surface scanning (steps 43 to 46). If a signal above a pre-determined level is detected, it is then determined that a position pointing device exists on the tablet. The operation then moves on to the next step 47.

If the position pointing device detected at step 46 is the first position pointing device, a command signal is transmitted to the position pointing device to change the resonance frequency from f0 to f1 so that the device will not interfere with a different position pointing device which will have the reset mode frequency f0 (steps 47 and 48) (FIG. 5C). Also, the position pointing device number N is incremented by 1 (step 49).

When the entire surface scanning operation from step 42 to step 49 is completed, the operation then returns to step 41.

At step 41, whether a position pointing device is detected or not will determine the subsequent processing. If a position pointing device is not detected (N=0), the entire surface scanning operation (steps 42 to step 49) will be repeated. If one or two position pointing devices are detected, coordinate detecting steps 50 to 52 are conducted for the position pointing device whose resonance frequency is changed to f1 in step 48.

FIG. 9 illustrates a waveform diagram at each segment; the operation of a command to change the resonant frequency from f0 to f1 is transmitted to the position pointing device, the frequency is changed to f1, and the coordinate is detected (step 48, step 50, step 51).

The diagram in FIG. 9 illustrates an example at step 43 and step 45 wherein the maximum signals are detected from the loop coil X7 and loop coil Y5 respectively.

The CPU 10 directs the selection circuit 2 to select the loop coil X7 which is closest to the position pointing device, to connect the transmission/reception change over circuit 3 to the transmission side terminal T, and to supply the signal to the loop coil X7 with the frequency f0.

In this state, CPU 10 transmits an electromagnetic wave (a) with frequency f0 from the loop coil X7 to the position pointing device for the predetermined duration (in the current embodiment, T=700 µS).

By this operation, an induced voltage (b) is generated in the resonance circuit 21, and the induced voltage (b) is supplied to the power circuit 24, detector circuit 25, and the detector circuit 26. The detector circuits 25 and 26 output a detector output (f) and a detector output (c), respectively.

By the detector output (c), an integrator output (d) and a comparator output (e) are outputted from the second path as shown in the diagram. Also, from the first path an integrator output (g) and a comparator output (h) are outputted as shown in the diagram.

Here, the CPU is set to 700 µS transmission duration, the comparator outputs (e) and (h) start up during this transmission duration.

When the 700 µS transmission duration is completed, both comparator outputs (e) and (h) are in a trailing edge. The output from the second path (e), which has the smaller time constant, enters into a trailing edge first, whereby the latch circuit 31 outputs the high level as a signal (i) simultaneously with the timing of the trailing edge of the output from the second path (e).

When the switch 32 is turned ON by the signal (i), the capacitor 22 is connected to the resonance circuit 21, and the resonance frequency of the resonance circuit 21 is changed from f0 to f1 (step 48).

When the resonance frequency of the position pointing device is changed to f1, the position pointing device becomes responsive to only the electromagnetic wave with frequency f1. For this reason, the CPU 10 sends out a control signal to the switch 12 to change the frequency from f0 to f1 in order to attain the coordinate value of the position pointing device continuously (step 50).

The CPU 10 directs the selection circuit 2 to select the loop coil X7, which is closest to the position pointing device, and to connect the transmission/reception change over circuit 3 to the transmission side terminal T. Then, the loop coil X7 transmits an electromagnetic wave with frequency f1(a) to the position pointing device.

In this manner, an induced voltage (b) is generated in the resonance circuit 21 of the position pointing device, and the induced voltage (b) is supplied to the detector circuits 25 and 26. The detector circuits 25 and 26 output detector outputs (f) and (c), respectively. Here, the transmission time designated by the CPU 10 is T=100 µS so that the output (e) from the second path 35 is not outputted, and the output (i) of the latch circuit 31 does not change. Thereby, the resonance circuit 21 maintains the resonance frequency f1.

After the 100 µS transmission time passes, the CPU 10 directs the selection circuit 2 to select the loop coil X5, and to switch the transmission/reception changeover circuit 3 to the reception side terminal R. In this loop coil X5 reception mode, the tablet side attains a reception signal through the same manner of operation as that explained in the aforementioned step 43.

This partial scanning operation is conducted, as illustrated in FIG. 9, by selecting the loop coil X7 at the transmission time, and by selecting loop coils X6, X7, X8, and X9 sequentially during the reception time (step 51).

Following the X-axial direction partial scanning, the Y-axial direction partial scanning is conducted as illustrated in FIG. 9. In other words, during the transmission time, the loop coil Y5 is selected, and during the reception time, the loop coils Y3, Y4, Y5, Y6, and Y7 are selected to conduct the partial scanning in the Y-axial direction in the same manner as for the X-axial direction partial scanning (step 51).

The position of the position pointing device in the X-axial direction is determined from the reception signal levels of the five loop coils centered around the X7 loop coil. The position of the position pointing device in the Y-axial direction is determined from the reception signal levels of the five loop coils centered around the Y5 loop coil (step 51)(FIG. 5D).

In case the reception signal level has not reached the predetermined value, the position pointing device is considered to have been taken away from the tablet surface (step 52), and the number of position pointing devices N is reduced by 1 (step 54). If there is no other position pointing device, N becomes 0 so that the operation returns to step 41 to conduct the aforementioned all surface scanning (step 55).

In case the signal level at step 52 reaches above the predetermined level, all surface scanning with frequency f0 will be conducted to detect whether another position pointing device has been newly placed on the tablet or not (FIG. 5E). For this purpose, the control of the CPU 10 is returned to step 42.

Now, a description will be given for all surface scanning when a position pointing device set for the frequency f1 is placed on the tablet, and tries to detect whether another position pointing device has been newly placed on the tablet or not.

The all surface scanning needs to be conducted by using the frequency f0, which is the reset frequency of a position pointing device, so that first a control signal is transmitted from the CPU 10 to connect the frequency change over switch 12 to the side to which an oscillator with f0 frequency is connected (step 42).

Next, the X-axial all surface scanning and Y-axial all surface scanning will be conducted as described above (steps 43–46). If a signal above the predetermined level is not detected through these all surface scans, then it is considered that there is no position pointing device on the tablet surface, and the operation will return the control of the CPU 10 to step 41 to conduct the coordinate detection repeatedly for the position pointing device whose frequency is already set for f1 (steps 41–51).

If a signal above the predetermined level is detected during all surface scanning (steps 43 to 46), it is considered that there is a second position pointing device on the tablet surface (FIG. 5F). In this case, this second position pointing device needs to have a partial scanning operation while keeping the frequency at f0, so that step 48 is skipped, and the position pointing device number is increased to N=2 (steps 47–49). 14

Through the aforementioned procedure, two position pointing devices, one operable at frequency f0 and the other at f1, are recognized. These two devices have frequencies different from each other, and are free from mutual interference, which enables the detection of two coordinate positions. When these two position pointing devices are placed on the tablet, the CPU 10 conducts operation steps 50 to 60 repeatedly to continuously detect the coordinate positions of the two position pointing devices (FIG. 5G).

For the first position pointing device set for frequency f1, an operation by steps 50 to 52 will be conducted. In this case, the position pointing device is already set for frequency f1, so that, excluding the 700 μS transmission period in FIG. 9, the aforementioned partial scanning operation will be repeated five times for the X-axis and Y-axis respectively at frequency f1 for a 100 μS transmission period to detect the coordinate.

For the second position pointing device set for frequency f0, an operation by steps 56 to 58 will be conducted. Excluding the 700 μS transmission period in FIG. 9, by conducting the partial scanning repeated five times for X-axis and Y-axis respectively at frequency f0 for a 100 μS transmission period, the coordinate is detected.

During steps 50 to 60, in which the coordinates of the two position pointing devices operable at frequencies f1 and f0 are alternately detected, if the position pointing device operable at frequency f1 is judged to have been taken away at step 52 (FIG. 5I), the resonance frequency of the remaining position pointing device operable at frequency f0 is changed from f0 to f1 at step 61 (FIGS. 5J and 5K), thus avoiding an interference in case another position pointing device with a reset frequency of f0 is placed on the tablet surface again (FIG. 5M).

This step 61 is conducted in the same manner as aforementioned step 48.

As described above, according to the present embodiment, even if two position pointing devices with the same configuration are placed on the tablet, the two pointed positions are detected without mutual interference by changing the resonance frequency of one position pointing device by a signal transmitted from the tablet. Also, from among multiple position pointing devices, any two in any combination can be used simultaneously.

Figure 10:
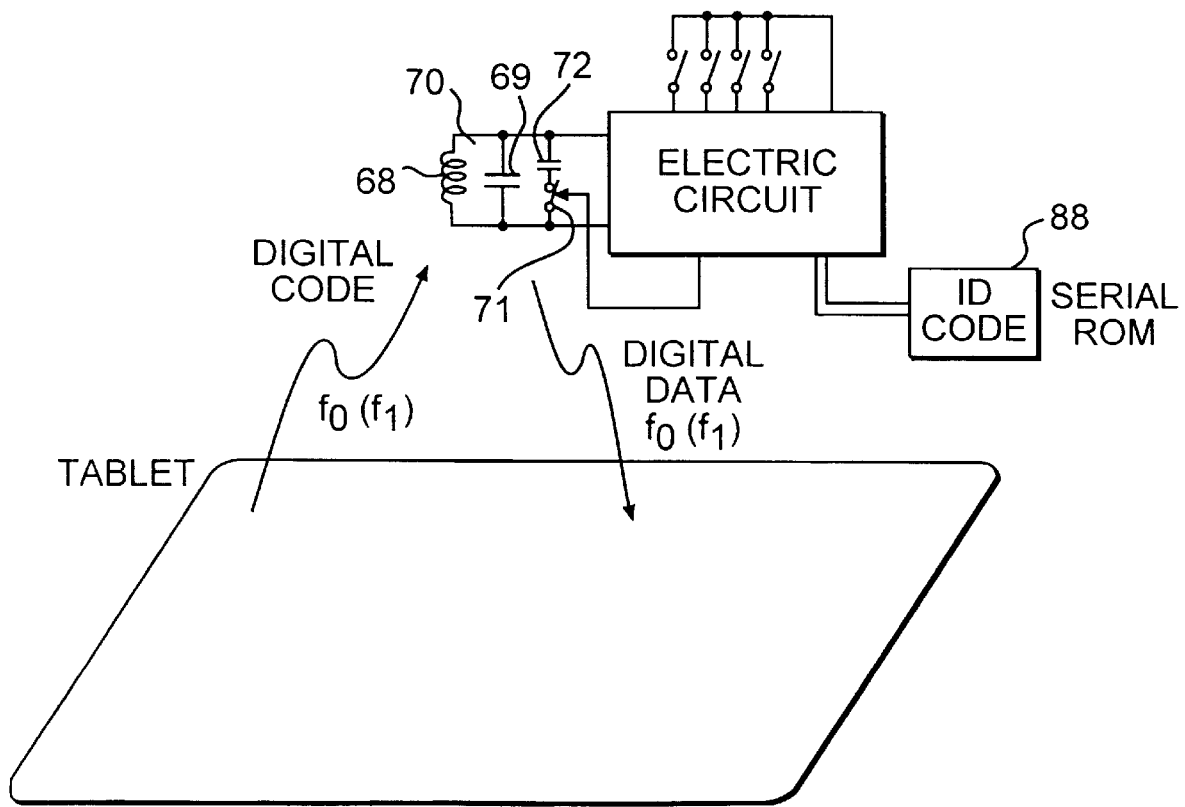
FIG. 10 is a schematic configuration diagram of a second embodiment of a position pointing device.
Figure 11:
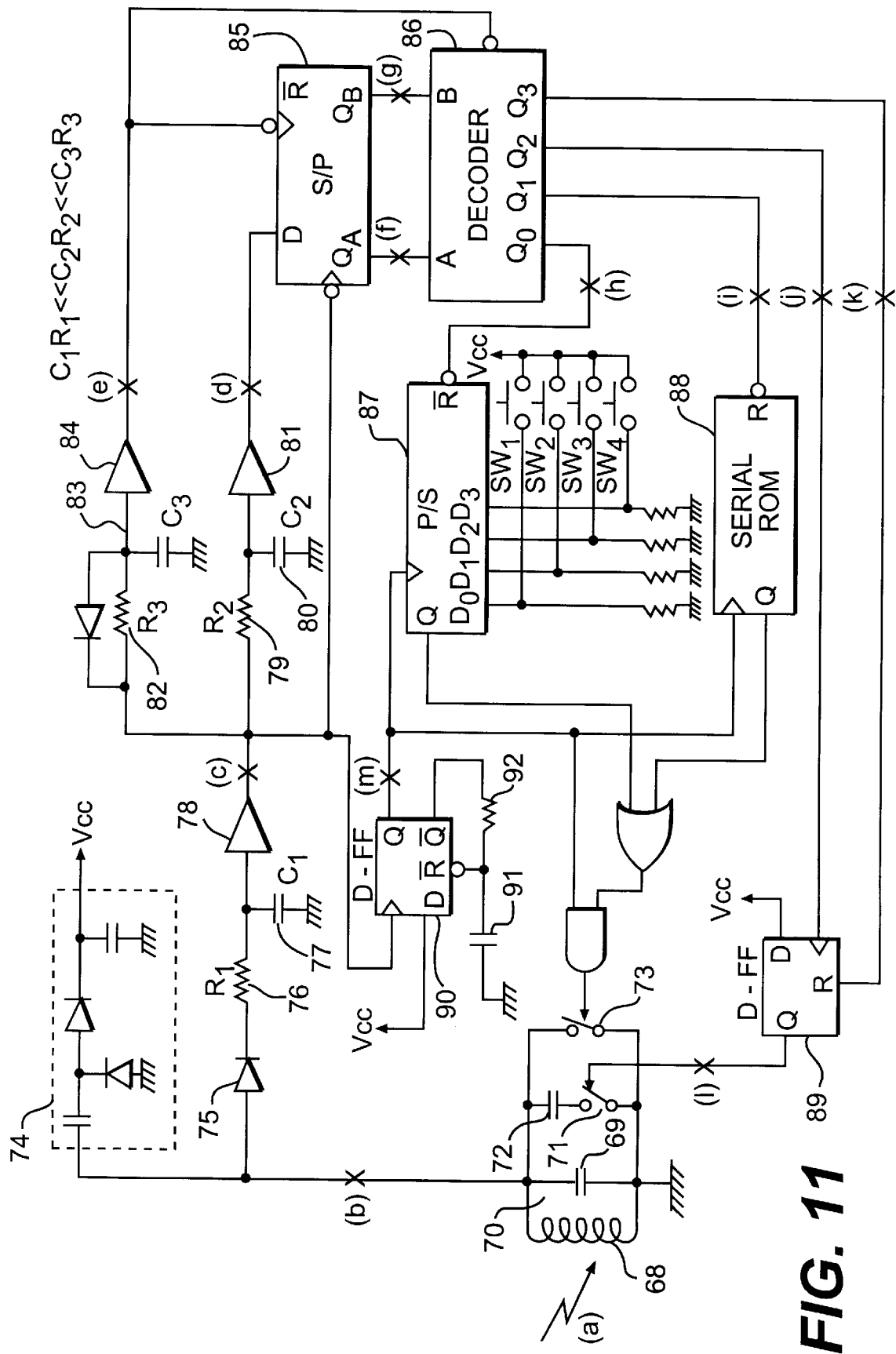
FIG. 11 is a circuit configuration diagram of the second embodiment of a position pointing device.

FIGS. 10 and 11 illustrate a position pointing device in accordance with a second embodiment. In the second embodiment, the tablet sends a control signal to the position pointing device in a binary code. A resonance frequency of a resonance circuit in the position pointing device changes when the binary code is detected as the predetermined value. The position pointing device returns switch information in accordance with an operation of the position pointing device or ID code set inside the position pointing device in case the detected binary code is not the same as the predetermined value.

The tablet used in the second embodiment can be the same as shown in FIG. 1, but the flowchart of the operation control program stored in CPU 10 is slightly different from the first embodiment. Specifically, the method of transmitting a command to change the resonance frequency from f0 to f1 toward the position pointing device at step 48 and step 61 is different.

Figure 12:
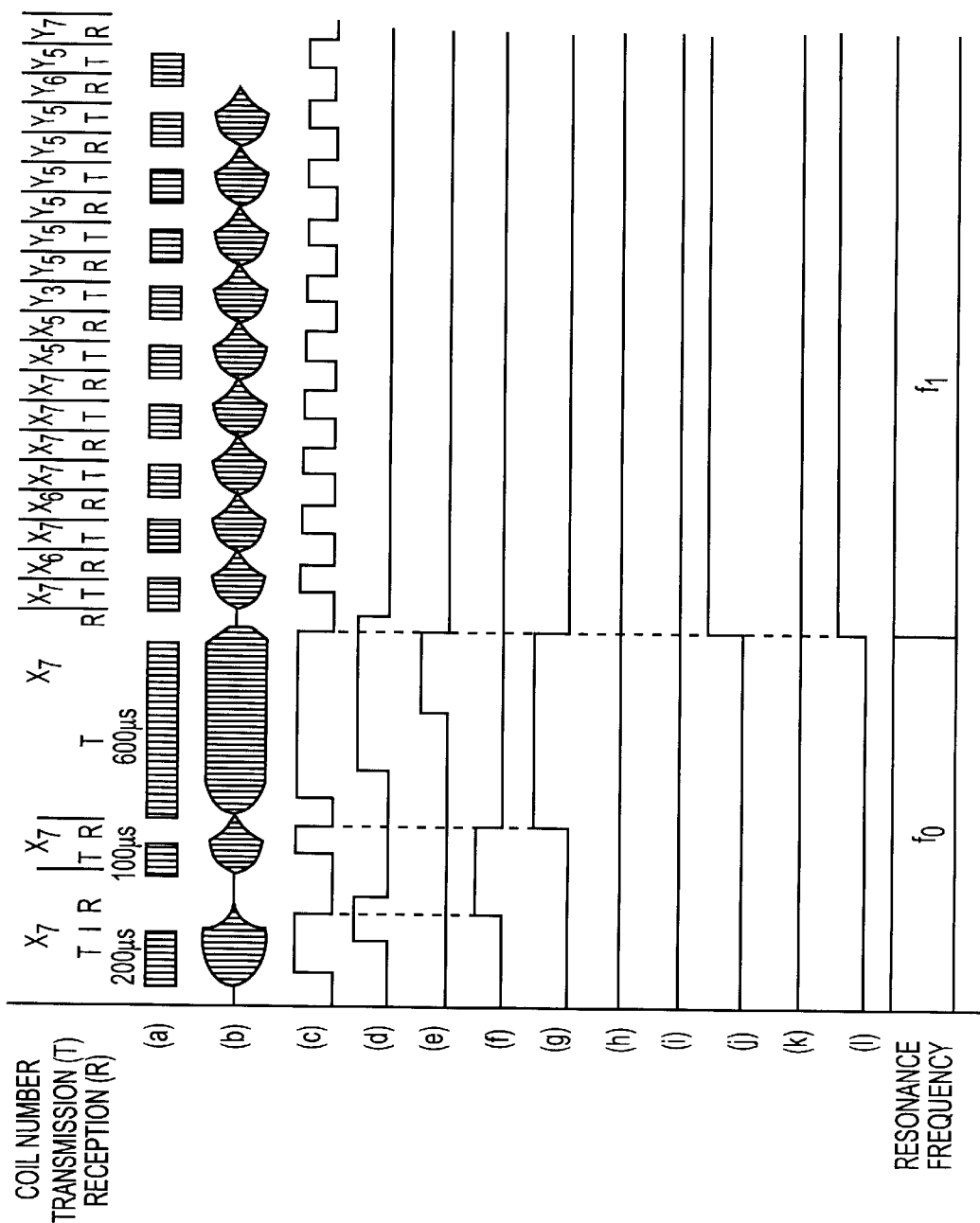
FIG. 12 is an output waveform diagram of the outputs at the points shown by x sign in FIG. 11

FIG. 12 is a waveform diagram of segments indicated by x signs in FIG. 11 when a command to change the resonance frequency from f0 to f1 is received. Changing the resonance frequency in the position pointing device is described with references to FIGS. 11 and 12.

In FIG. 11, a coil 68 and a capacitor 69 comprise a resonance circuit 70. A switch 71 connects a capacitor 72 to resonance circuit 70. In the second embodiment, the switch 71 may be configured as shown in FIG. 4. The switch 71 and the capacitor 72 change the resonance frequency from f0 to f1, in the same manner as in the first embodiment. At the reset mode, the switch 71 is open, so that the resonance frequency of the resonance circuit 70 is f0. The value of the coil 68 and the capacitors 69 and 72 are selected to cause the resonance frequency of the resonance circuit 70 to become f1 when the switch 71 closes.

A switch 73 is connected to both ends of the resonance circuit 70. Through the control of the switch 73, the position pointing device enables switch information, in accordance with the operation of the position pointing device or an ID code set inside the position pointing device, to return to the tablet as an existence or non-existence of a signal.

The resonance circuit 70 is connected to a power source circuit 74 to attain power. The resonance circuit 70 is also connected to a detector circuit composed of a comparator 78 and a first integration circuit having a diode 75, a resistance 76 (R1), and a capacitor 77 (C1). The output of the comparator 78 reflects the result of the detection whether the value of the signal b induced in the resonance circuit 70 is above the predetermined level or not. When an electromagnetic wave is transmitted intermittently as shown in FIG. 12 wave form a, signal (c) maintains a high level corresponding to the transmission period.

The time constant of the first integration circuit comprising a resistance 76 (R1) and a capacitor 77 (C1) is set for generating an output from the comparator 78 when an electromagnetic wave is transmitted from the tablet continuously for a predetermined period (about 50 $\mu$S in this embodiment).

The output of the comparator is also connected to second and third integration circuits having different time constants, a clock input terminal of the serial parallel conversion circuit 85, and the clock input terminal of the flip-flop 90. The second integration circuit comprising a resistance 79 (R2) and a capacitor 80 (C2) is connected to the comparator 81, and the output of the comparator 81 is connected to the data terminal D of the serial parallel conversion circuit 85. The third integration circuit comprising a resistance 82 (R3) and a capacitor 83 (C3) is connected to a comparator 84, and the output of the comparator 84 is connected to the reset terminal R of the serial parallel conversion circuit 85 and the clock input terminal for a latch of the decoder 86.

The time constant of the second integration circuit comprising the resistance 79 (R2) and the capacitor 80 (C2) is sufficiently larger than the time constant of the first integration circuit, and it is set to generate the output from the comparator 81 when an electromagnetic wave is continuously transmitted from the tablet for a predetermined duration (around 150 $\mu$S in this embodiment).

The time constant of the third integration circuit comprising the resistance 82 (R3) and the capacitor 83 (C3) is sufficiently larger than the time constant of the second integration circuit, and it is set to generate the output from the comparator 84 when an electromagnetic wave is transmitted continuously from the tablet for a predetermined period (350 $\mu$S in this embodiment).

The transmission period from the tablet is detected by the first, second, and third integration circuits, configured as described above, and the comparator. The transmission period is then reproduced as a 2 bit binary code by the serial parallel conversion circuit 85.

Two bit output terminals QA and QB of the serial parallel conversion circuit 85 are connected to the input terminals A and B of the decoder 86 respectively, and the decoder 86 outputs the decoded result of the input values of the 2 bit input terminals A and B at the trailing edge timing of the latch clock (signal e) as Q0, Q1, Q2 and Q3.

When the input of the decoder 86 (B, A) is (0, 0), then only Q0 goes to a high level, if it is (0, 1) then only Q1 goes high, if (1, 0) then only Q2 goes high, and if (1, 1) then only Q3 goes high.

Each of the respective output terminals Q0, Q1, Q2 and Q3 of the decoder 86 becomes a control signal to operate in accordance with the corresponding 2 bit code.

When a control command of (0, 0) is transmitted from the tablet, Q0 is outputted as the signal (h). This signal (h) is inputted in the reset terminal R of the parallel serial conversion circuit 87, and when the signal (h) goes to a high level the parallel serial conversion circuit 87 operates.

The parallel serial conversion circuit 87 sequentially transmits digital data, SW1, SW2, SW3 and SW4, which are the operation information of the position pointing device, at each rising edge timing of the clock signal (m). In this manner, the resonance circuit 70 is controlled via the switch 73, and the operations of SW1, SW2, SW3, and SW4 are detected in the tablet as the existence or nonexistence of the signal.

The clock signal (m) is generated with a constant pulse width (around 100 $\mu$S in the current embodiment) by a well known one-shot multivibrator circuit comprising a flip-flop 90, resistance 91, and capacitor 92.

This is a configuration for controlling the switch 73 continuously until the electromagnetic wave transmission from the tablet is completed, although the signals (b) and (c) are promptly extinguished when the resonance circuit establishes a short circuit by the switch 73.

When a control command (0, 1) is transmitted from the tablet, Q1 is outputted as the signal (i). This signal (i) is connected to the reset terminal R of the serial ROM 88, and when the signal (i) goes to a high level, the serial ROM 88 starts operation. The serial ROM 88 sequentially transmits ID codes specific to the position pointing device prewritten inside the serial ROM 88 at each rising edge timing of the clock signal (m). The tablet side detects these ID codes as the existence or nonexistence of the signal.

When a control command (1, 0) is transmitted from the tablet, Q2 is outputted as the signal (j). This signal (j) is inputted in the clock input terminal of the flip-flop 89, and the flip-flop 89 outputs a high level signal at a rising edge timing of the signal (j). By this output signal (l), the capacitor 72 is connected to the resonance circuit 70 via the switch 71, causing the resonance frequency to change to f1.

When a control command (1, 1) is transmitted from the tablet, Q3 is outputted as the signal (k). This signal (k) is inputted in the reset terminal R of the flip-flop 89, and the flip-flop 89 outputs low level at the rising edge timing of the signal (k). In this manner, the resonance frequency of the resonance circuit 70 is brought back to f0. This control command, (1, 1), is not absolutely needed for the current embodiment, but a position pointing device whose frequency is changed to f1 by receiving a command (1, 0) from the tablet, can be brought back to f0 by receiving the command (1, 1). When the position pointing device is taken away from the surface of the tablet, the frequency of the position pointing device is also brought back to f0.

In FIG. 12, digital codes are expressed by the transmission periods from the tablet, showing an operation while the resonance frequency of the position pointing device is changed from f0 to f1 when the control command (1, 0) is received.

CPU 10 allows transmission and reception between the position pointing device and the tablet as follows: transmission T=200 $\mu$S, reception R=200 $\mu$S; transmission T=100 $\mu$S, reception R=100 $\mu$S; transmission T=600 $\mu$S, reception R=100 $\mu$S (FIG. 12).

The CPU 10 selects the closest loop coil (X7 in this example) to the position pointing device by selection circuit 2, switches the transmission reception switch over circuit 3 to the transmission terminal T side, and transmits an electromagnetic wave (a) to the position pointing device for a period of T=200 $\mu$S.

In this manner, an induced voltage (b) is generated in the resonance circuit 70. This transmission period, T=200 μS, is sufficiently longer than the time constant of the second integration circuit, so that by this transmission operation, the outputs of the comparator 78 and 81 start rising. When the transmission period, T=200 μS, is passed, the CPU 10 switches the transmission reception circuit 3 to the reception terminal R side, and halts the transmission of the electromagnetic wave for the period of R=200 μS.

During this period, the outputs of the comparator 78 and 81 change to the low level, wherein the output of the comparator 78 enters a trailing edge first, then the output of the comparator 81 enters to the trailing edge next.

At the trailing edge of the comparator 78, the output value of the comparator 81 is taken in to the serial to parallel conversion circuit 85. In this manner, the signals (g) and (f) to the decoder 86 become "0" and "1" respectively.

Then, the CPU 10 causes a transmission of an electromagnetic wave for the period, T=100 μS. By this, an induced voltage (b) is generated in the resonance circuit 70. This transmission period, T=100 μS, is sufficiently shorter than the time constant of the second integration circuit, and sufficiently longer than the time constant of the first integration circuit, so that by this transmission operation of the transmission period, T=100 μS, the output of the comparator 78 starts rising while the output of the comparator 81 maintains the low level.

After the transmission period, T=100 μS, the CPU 10 switches the transmission/reception switch over circuit 3 to the reception terminal R side, and halts the transmission of the electromagnetic wave for the period, R=100 μS.

During this period, the output of the comparator 78 changes to a low level, and the output value of the comparator 81, "0", appears at the serial parallel conversion circuit 85. At the same time, the value taken in through the previous transmission/reception for 200 μS, "1", appears as the signal (g), so that the signals (g) and (f) to the decoder 86 become "1" and "0" respectively.

Then, the CPU 10 transmits an electromagnetic wave to the position pointing device for the transmission period, T=600 μS, in order to convert these "1" and "0" data to the control signal. This transmission period, T=600 μS, is sufficiently longer than the time constant of the third integration circuit, so that by this transmission operation of the transmission period, T=600 μS, the outputs of the comparators 78, 81 and 84 as (c), (d), and (e) respectively, start rising as shown in the diagram.

After the transmission period, T=600 μS, the CPU 10 switches the transmission/reception switch over circuit 3 to the reception terminal R side, and halts the transmission of the electromagnetic wave for the period, R=100 μS. During this period, the outputs of the comparators 78, 81 and 84 as (c), (d) and (e) respectively, all enter into the trailing edge, wherein by the trailing edge of the signal (e) the outputted data (1, 0) from the serial parallel conversion circuit 85 is taken in to the decoder 86, and only the Q2 output showing the data (1, 0) becomes high level, and the signal (j) becomes high level.

By the rising edge of the signal (j) the output of the flip-flop 89 (l) becomes high level. When the signal (l) becomes high level, the resonance frequency of the resonance circuit 70 is changed from f0 to f1.

A purpose of inserting a diode in parallel with the resistance 82 is to switch the resonance frequency promptly by causing a trailing edge of the signal (e) as soon as the signal (c) gets into the trailing edge. This diode is optional.

The current embodiment, in the same manner as the first embodiment, can detect simultaneously any two position pointing devices among plural position pointing devices, placed on the tablet as shown in FIG. 1, in accordance with the flow chart shown in FIG. 6.

According to the present embodiment, the tablet transmits a binary code toward the position pointing device, thus enabling it to switch the frequency and detect the operation information of the switch or an ID code specific to each position pointing device.

In other words, by transmitting a predetermined code from the tablet at the time of detecting the coordinates in steps 51 or 57 in FIG. 6, the necessary information can be attained.

In FIG. 12, if the CPU 10 causes the transmission/reception between the position pointing device and the tablet as follows: transmission T=100 μS, reception time R=100 μS; transmission T=100 μS, reception R=100 μS; transmission T=600 μS, reception R=100 μS, and transmits the code (0, 0), through the four transmission reception sequences following this, the operation information of the switches 1, 2, 3, and 4 will be detected respectively at the tablet side.

When the switch is Off, a signal will be detected at the tablet side; when the switch is On, a signal will not be detected at the tablet side. It is also acceptable to include more operation information of the position pointing device than just switch data, e.g., a pen pressure digital information converted from an analogue information.

If the CPU 10 causes transmission/reception between the position pointing device and the tablet as follows: transmission T=100 μS, reception time R=100 μS; transmission T=200 μS, reception R=200 μS; transmission T=600 μS, reception R=100 μS, and transmits the code (0, 1), then, by the transmission/reception sequence after this, data written on the serial ROM 88 will be detected 1 bit by 1 bit in sequence. In other words, when the data is "0," a signal will be detected at the tablet side, and when the data is "1" a signal will not be detected at the tablet side.

In the present embodiment, an example is shown in which, by using the two frequencies f0 and f1, any two position pointing devices among plural position pointing devices can be detected simultaneously on the same tablet. By making the tablet capable of setting a larger number of frequencies by commands, three or more position pointing devices can be detected simultaneously. Thus, for example, referring to the first embodiment, a third capacitor and a second switch could be added, in parallel, to the resonance circuit 21. The third capacitor could have the same or different capacitance than the capacitor 22.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A position detecting apparatus for detecting a position indicated by a first position pointing device using electromagnetic induction between the first position pointing device and a tablet;

the first position pointing device comprising: a resonance circuit having at least two selectable resonance frequencies; means for selecting one of the at least two resonance frequencies; and means for receiving frequency selecting information for the frequency selecting means; and the tablet comprising: means for transmitting the frequency selecting information to the receiving means to set an initial resonance frequency in the resonance circuit of the first position pointing device; means for detecting the first position pointing device having the initial resonance frequency; means for selectively changing the resonance frequency of the first position pointing device to a second resonance frequency; means for detecting an additional position pointing device by transmitting a signal equal to the initial resonance frequency; and means for detecting the first position pointing device using the second resonance frequency.

2. The apparatus as claimed in claim 1, the tablet further comprising means for adjusting the transmission time for the transmitting means, and the first position pointing device further comprising means for determining the transmission time.

3. The apparatus as claimed in claim 2, wherein the transmission time indicates a binary code.

4. The apparatus as claimed in claim 3, wherein the means for determining the transmission time comprises a plurality of integration circuits and a comparator, a voltage induced by the electromagnetic wave being converted to the binary code in accordance with the time constant of the integration circuits and the threshold voltage of the comparator.

5. The apparatus as claimed in claim 3, wherein the resonance circuit comprises: a first capacitor, a second capacitor, and a switch connecting the first and second capacitors.

6. The apparatus as claimed in claim 5, wherein the resonance circuit further comprises an inductor, and wherein the inductor, the first capacitor, and the second capacitor are connected in parallel.

7. The apparatus as claimed in claim 5, wherein the binary code determines the operation of the switch.

8. The apparatus as claimed in claim 3, wherein the first position pointing device further comprises means for transmitting operation information to the tablet in response to a specific binary code.

9. The apparatus as claimed in claim 8, wherein the operation information includes an identification code.

10. The apparatus as claimed in claim 1, wherein the resonance circuit comprises: a first capacitor, a second capacitor, and a switch connecting the first and second capacitors.

11. The apparatus as claimed in claim 10, wherein the resonance circuit further comprises an inductor, and wherein the inductor, the first capacitor, and the second capacitor are connected in parallel.

12. A position detecting apparatus for detecting a position indicated by a first position pointing device using electromagnetic induction between the first position pointing device and a tablet;

the first position pointing device comprising: a resonance circuit having first and second selectable resonance frequencies; means for selecting one of the first and second resonance frequencies; and means for receiving frequency selecting information for the frequency selecting means; and the tablet comprising means for transmitting an electromagnetic wave as the frequency selecting information to the receiving means to set the first resonance frequency in the resonance circuit of the first position pointing device, the electromagnetic wave having a first frequency corresponding to the first resonance frequency of the first position pointing device; means for selectively changing the resonance frequency of the first position pointing device to the second resonance frequency; means for detecting an additional position pointing device by transmitting a signal equal to the first resonance frequency, and means for detecting the first position pointing device using the second resonance frequency.

13. The apparatus as claimed in claim 12, wherein the first resonance frequency is the resonance frequency at a reset mode.

14. The apparatus as claimed in claim 12, the tablet further comprising means for adjusting the transmission time of the transmitting means, and the first position pointing device further comprising means for determining the transmission time.

15. The apparatus as claimed in claim 14, wherein the transmission time indicates a binary code.

16. The apparatus as claimed in claim 15, wherein the means for determining the transmission time comprises a plurality of integration circuits and a comparator, a voltage induced by the electromagnetic wave being converted to the binary code in accordance with the time constant of the integration circuits and the threshold voltage of the comparator.

17. The apparatus as claimed in claim 15, wherein the resonance circuit comprises: a first capacitor, a second capacitor, and a switch connecting the first and second capacitors.

18. The apparatus as claimed in claim 17, wherein the resonance circuit further comprises an inductor, and wherein the inductor, the first capacitor, and the second capacitor are connected in parallel.

19. The apparatus as claimed in claim 17, wherein the binary code determines the operation of the switch.

20. The apparatus as claimed in claim 15, wherein the first position pointing device further comprises means for transmitting operation information to the tablet in response to a specific binary code.

21. The apparatus as claimed in claim 20, wherein the operation information includes an identification code.

22. A position detecting apparatus for detecting positions indicated by first and second position pointing devices using electromagnetic induction between the pointing devices and a tablet;

the first position pointing device comprising: a resonance circuit having at least two selectable resonance frequencies; means for selecting one of the at least two resonance frequencies; and means for receiving frequency selecting information for the frequency selecting means;

the second position pointing device comprising: a resonance circuit having at least two selectable resonance frequencies; means for selecting one of the at least two resonance frequencies; and means for receiving frequency selecting information for the frequency selecting means; and the tablet comprising means for transmitting the frequency selecting information to the receiving means to set an initial resonance frequency in the resonance circuit of the first position pointing device: means for detecting the first position pointing device having the initial resonance frequency; means for selectively changing the resonance frequency of the first position pointing device to a second resonance frequency; means for detecting the second position pointing device by transmitting a signal equal to the initial resonance frequency of the first position pointing device; and means for detecting the first position pointing device using the second resonance frequency of the first position pointing device.

23. The apparatus as claimed in claim 22, wherein the resonance circuits each comprise: a first capacitor, a second capacitor, and a switch connecting the first and second capacitors.

24. The apparatus as claimed in claim 23, wherein the resonance circuits further comprise an inductor, and wherein the inductor, the first capacitor, and the second capacitor are connected in parallel.

25. The apparatus as claimed in claim 24, the tablet further comprising means for adjusting the transmission time of the transmitting means, and the position pointing devices each further comprising means for determining the transmission time.

26. The apparatus as claimed in claim 25, wherein the transmission time indicates a binary code.

27. The apparatus as claimed in claim 26, wherein the means for determining the transmission time comprises a plurality of integration circuits and a comparator, a voltage induced by the electromagnetic wave being converted to the binary code in accordance with the time constant of the integration circuits and the threshold voltage of the comparator.

28. The apparatus as claimed in claim 27, wherein the resonance circuits of the first and second position pointing devices have the same selectable resonance frequencies, and wherein the selection means of the first position pointing device selects a different resonance frequency than the selection means of the second position pointing device.

29. The apparatus as claimed in claim 22, wherein the resonance circuits of the first and second position pointing devices have the same selectable resonance frequencies, and wherein the selection means of the first position pointing device selects a different resonance frequency than the selection means of the second position pointing device.

30. The apparatus as claimed in claim 22, further comprising:
a third position pointing device comprising: a resonance circuit having at least three selectable resonance frequencies; means for selecting one of the at least three resonance frequencies; and means for receiving frequency selecting information for the frequency selecting means;
wherein the resonance circuit of the first position pointing device has at least three resonance frequencies and wherein the resonance circuit of the second position pointing device has at least three resonance frequencies.

31. A method for detecting more than one position pointing device used on a tablet, each position pointing device indicating the position through an electromagnetic induction between the position pointing device and the tablet, and each position pointing device having a resonance circuit having at least two resonance frequencies, the method comprising the steps of:
scanning for a first position pointing device using a first frequency;
detecting a first position pointing device have a resonance circuit with the first frequency as the resonance frequency;
changing the resonance frequency of the resonance circuit of the first position pointing device to a second frequency;
detecting the position of the first position pointing device using the second frequency; and
scanning for a second position pointing device using the first frequency.

32. The method according to claim 31, further comprising the steps of:
detecting a second position pointing device having a resonance circuit with the first frequency as the resonance frequency; and
detecting the position of the second position pointing device using the first frequency.

33. The method according to claim 32, further comprising the steps of:
detecting the removal of the first position pointing device;
changing the resonance frequency of the second position pointing device to the second resonance frequency; and
scanning for a third position pointing device or the first position pointing device using the first frequency.

* * * * *

UNITED STATES PATENT AND TRADEMARK OFFICE
CERTIFICATE OF CORRECTION

PATENT NO. : 6,005,555
DATED : December 21, 1999
INVENTOR(S) : Yuji KATSURAHIRA et al.

It is certified that error appears in the above-indentified patent and that said Letters Patent is hereby corrected as shown below:

Claim 31, col. 16, line 16, change "have" to --having--.

Signed and Sealed this

Fourteenth Day of November, 2000

Attest:

Q. TODD DICKINSON

Attesting Officer

Director of Patents and Trademarks